United States Patent [19]

Uchida et al.

[11] Patent Number: 4,860,247
[45] Date of Patent: Aug. 22, 1989

[54] MULTI-WINDOW CONTROL SYSTEM

[75] Inventors: Noriaki Uchida; Hideaki Gemma, both of Hadano, Japan

[73] Assignee: Hitachi, Ltd., Tokyo, Japan

[21] Appl. No.: 16,087

[22] Filed: Feb. 18, 1987

[30] Foreign Application Priority Data

Feb. 21, 1986 [JP] Japan ................................. 61-37096

[51] Int. Cl.[4] ............................ G06F 3/00; G06F 7/00
[52] U.S. Cl. .................................................... 364/900
[58] Field of Search ... 364/200 MS File, 900 MS File

[56] References Cited

U.S. PATENT DOCUMENTS

| 4,197,590 | 4/1980 | Sukouick | 364/900 |
|---|---|---|---|
| 4,204,208 | 5/1980 | McCarthy | 364/900 |
| 4,219,881 | 8/1980 | Wilske | 364/900 |
| 4,326,264 | 4/1982 | Cohen et al. | 364/900 |
| 4,482,982 | 11/1984 | Yu et al. | 364/900 |
| 4,525,806 | 6/1985 | Barnes et al. | 364/900 |
| 4,536,856 | 8/1985 | Hiroishi | 364/900 |
| 4,539,655 | 9/1985 | Trussell et al. | 364/900 |
| 4,555,775 | 11/1985 | Pike | 364/900 |
| 4,574,364 | 3/1986 | Tabata et al. | 364/900 |
| 4,577,288 | 3/1986 | Busch | 364/900 |
| 4,658,351 | 4/1987 | Teng | 364/200 |
| 4,688,167 | 8/1987 | Agarwal | 364/200 |

Primary Examiner—Thomas M. Heckler
Assistant Examiner—Joseph T. Fitzgerald
Attorney, Agent, or Firm—Saidman, Sterne, Kessler & Goldstein

[57] ABSTRACT

A multi-window display control system, which is constructed so that a plurality of terminals having a multi-window display are connected through a terminal controller with a processor having a high priority and a processor having a low priority. One of the terminals is assigned as a common terminal displaying messages coming from either of the processors. The terminal controller is provided with a save buffer. The frequency of use of each of the virtual screen buffers of the common terminal is stored. When a message coming from the processor having a high priority is received, the virtual screen buffer, whose frequency of use is the lowest, is selected among the virtual screen buffers of the common terminal. The message is stored in the selected virtual screen buffer after having saved the content of the selected virtual screen buffer in the save buffer.

6 Claims, 6 Drawing Sheets

MULTI-WINDOW CONTROL SYSTEM

BACKGROUND OF THE INVENTION

1. Field of the Invention

This invention relates to a multi-window display control system, and in particular to a multi-window display control system suitable for a system in which a multi-window display terminal is used for a terminal of a first processor and for a terminal of a second processor having a priority higher than that of the first processor.

2. Description of the Prior Art

In a computer system, messages coming from a service processor regarding employment, maintenance, and diagnosis of the system (console messages) are displayed on a terminal exclusively used for the service processor (console terminal). While the user is using the system, business messages are displayed on a terminal exclusively used for business coming from a central processing unit (CPU) used for the business.

Recently a system permitting cost reductions by eliminating console terminals or console terminal controllers effecting the display of the messages coming from the service processor, has come into widespread use. In this system, one of a plurality of terminals, or only one terminal, disposed around a small computer system is used as both the console terminal and as the terminal for displaying business messages in order to reduce the number of required terminals.

Heretofore, in the case where a terminal having a multi-window display was used as the console terminal and as the terminal for displaying business messages, commonly one of a plurality of the terminal's virtual screen buffers was fixedly assigned for storing the messages coming from the service processor. A terminal controller wrote the messages for business sent from the CPU in a specified virtual screen buffer of a specified terminal in accordance with the terminal address and the virtual screen buffer address included in the message write-in command. The terminal controller also wrote the console messages sent from the service processor in a specified screen buffer of a specified terminal in accordance with the terminal address included in the message write-in command and the virtual screen buffer address assigned fixedly for console messages. Such a system is disclosed, e.g., in Japanese Patent Unexamined Publication No. 54-152431.

Since the console messages coming from the service processor are emergent, e.g. messages notifying of errors in the system hardware, according to prior techniques a screen buffer was fixedly assigned exclusively for the console messages. Therefore, when a console message was transmitted it was immediately received and displayed on the terminal. However, this can be inconvenient for the operator of the terminal. For example, in the case where the terminal is provided with four virtual screen buffers, four kinds of screens can be displayed alternatively on the display screen by utilizing the four virtual screen buffers, unless the terminal is constructed so as to receive the console messages. If the terminal is constructed so as to receive the console messages, only three virtual screen buffers can be used and up to three kinds of screens can alternatively be displayed.

In the foregoing example, with the same hardware construction of the terminal, the number of virtual screen buffers which can be used for the display of business is reduced in comparison with the case where the terminal is used exclusively for business. In contrast, if it is intended that the number of virtual screen buffers available for business messages on a common terminal which displays both business and console messages is to be equal to the number of virtual screen buffers of the terminals used exclusively for displaying business messages, then a virtual screen buffer used exclusively for console messages should be disposed apart from those used exclusively for business in the terminal which displays both types of messages.

In the case where the common console/business terminals are intended to have the same number of virtual screen buffers for business as the terminals used exclusively for business, it is necessary to associate a virtual screen buffer for the console messages with each of the terminals which are intended for console/business display. That raises the cost of the system.

Furthermore, there is the case where a terminal having one virtual screen buffer is used as a common console/business terminal. When console messages are frequently outputted the problem arises that the display of emergent console messages prevents the use of the terminal as a terminal for business.

The above described problem arises not only in the case where a common terminal is used for the display of console messages and for the display of business. The above described problems also arise in general in the case where a common terminal is used for the display of outputs of a plurality of processors having different output priorities.

SUMMARY OF THE INVENTION

The object of the present invention is to realize a common terminal for processors having different priorities. A further object of the present invention is to provide a multi-window display control system to be used in conjunction with such a terminal whose total cost is reduced without limiting the number of virtual screens used for processors having low priorities.

According to the present invention there are disposed means for holding the address of the common terminal assigned for the display of messages coming from processors having low priorities and for the display of messages coming from processors having high priorities. There are also disposed means for storing the state of use of the virtual screen buffers within the terminal, e.g. the frequency of use of each of the virtual screen buffers.

In the case where a message coming from a processor having a low priority is inputted to the terminal controller, the address of the terminal assigned for the display of the message is compared with the address of the common terminal. In the case where the two addresses do not coincide, the message is sent to the terminal as usual. In the case where the two addresses coincide, the message is sent to the common terminal and at the same time the state of use of the virtual screen buffer is updated according to the virtual screen buffer storing the message within the terminal.

A save buffer is disposed in the terminal controller. Thus, in the case where a message coming from a processor having a high priority is inputted to the terminal controller, a virtual screen buffer is selected according to the state of use of the virtual screen buffers within the common terminal (e.g., a virtual screen buffer used least frequently is selected for storing the message) and the message is sent to the common terminal to be stored in the selected virtual screen buffer. After saving the contents of the selected virtual screen buffer have been saved within the common terminal in the save buffer, the message is sent out for display.

A system constructed as described above allows all the virtual screen buffers of a common terminal to be utilized by a processor having a low priority without exclusively disposing any virtual screen buffer for storing a message coming from a processor having a high priority. It is possible to display a message coming from a processor with a high priority in the terminal at any time, while suppressing influences on the use of the common terminal to display messages from the processor having a low priority. The cost of the system can therefore be lowered.

It is also possible to assign any terminal as the common terminal. In addition, it is possible that, in the case where the terminal has only one virtual screen buffer and the relevant terminal is used as a terminal of a processor having a low priority, the output of a processor having a high priority is stored in the terminal without destroying any virtual screen. The use of the terminal of the processor having a low priority is therefore effected without any trouble, regardless of the output of the processor having a high priority.

The problematic situation in which a message from a processor having a high priority is stored in a virtual screen buffer of the common terminal and a processor having a low priority commands reading-out or writing-in a message to the same virtual screen buffer of the common terminal is resolved in the present invention. This problem is solved by disposing in the terminal controller, a memory for storing the address of the common terminal and the address of the virtual screen buffer designated for storing the in-coming message. In the case where a message which has come from a processor having a high priority has been sent to the common terminal, when a message coming from a processor having a low priority is sent to the terminal controller, the address of the terminal assigned for displaying the high priority message and the address of the similarly assigned virtual screen buffer are compared with the respective addresses stored in the memory described above. When both the addresses of the terminal and those of the virtual screen buffer coincide respectively, the message is written in the save buffer, or the message is read-out from the save buffer.

BRIEF DESCRIPTION OF THE DRAWINGS

These and other objects and advantages of the present invention will become apparent by reference to the following description and accompanying drawings, wherein:

FIGS. 4 to 6 are flow charts, in the case where the multi-window display control system is realized by the program control, wherein

DESCRIPTION OF THE PREFERRED EMBODIMENTS

Before explaining an embodiment of this invention, the prior art multi-window display control system will be explained.

Figure 1:
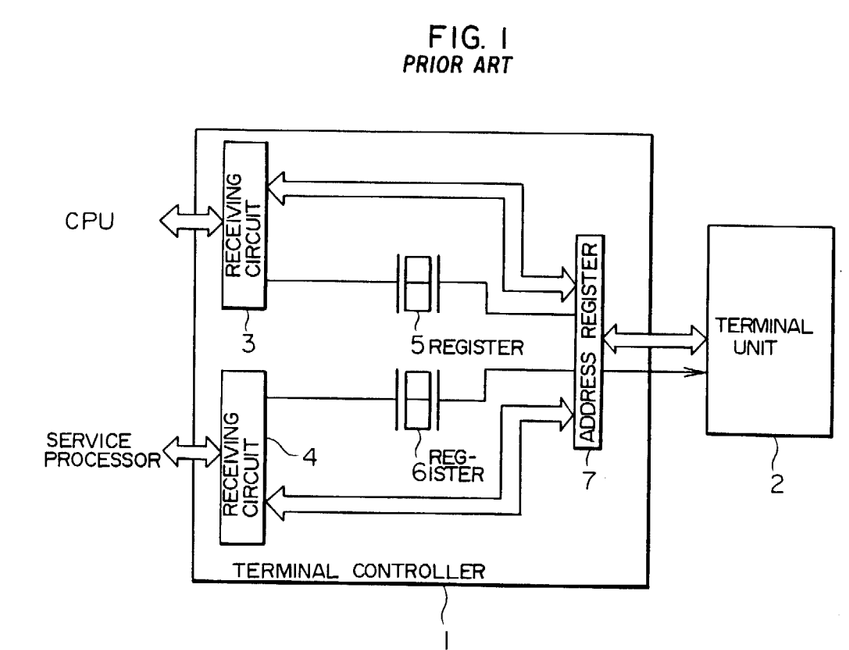
FIG. 1 is a scheme illustrating the construction of a prior art multi-window display control system having a virtual screen buffer used exclusively for the console message.

FIG. 1 shows the construction of an example of prior art multi-window display control systems, in which a terminal having a multi-window display is used for both the console terminal and for the terminal for business.

The terminal 2 includes a plurality of virtual screen buffers and performs the function of displaying the contents of those virtual screen buffers. The terminal controller 1 is connected through a transmitting/receiving circuit 7 with the terminal 2. Message for business coming from the CPU (not shown in the figure) are sent through a transmitting/receiving circuit 3 to a virtual screen buffer indicated by an address in a business screen address register 5. Console messages coming from the service processor (not shown) are sent through another transmitting/receiving circuit 4 to a virtual screen buffer indicated by an address in a console address register 6. To the console address register 6 is fixedly assigned the address of one of the virtual screen buffers in the terminal 2. On the other hand, to the business screen address register 5 is assigned an address other than the address of the console address register 6. The commands in the business and console messages also include the address of the terminal displaying the message and the terminal is assigned according thereto. For the sake of simplicity this will be omitted.

In the construction indicated in FIG. 1, one of the virtual screen buffers in the terminal is fixedly assigned as the console screen acting as the terminal for the service processor. This gives rise to an inconvenience for the operator. On the other hand, if a virtual screen buffer used exclusively for the console screen is disposed separately in the terminal, the cost of the terminal is increased.

Figure 2:
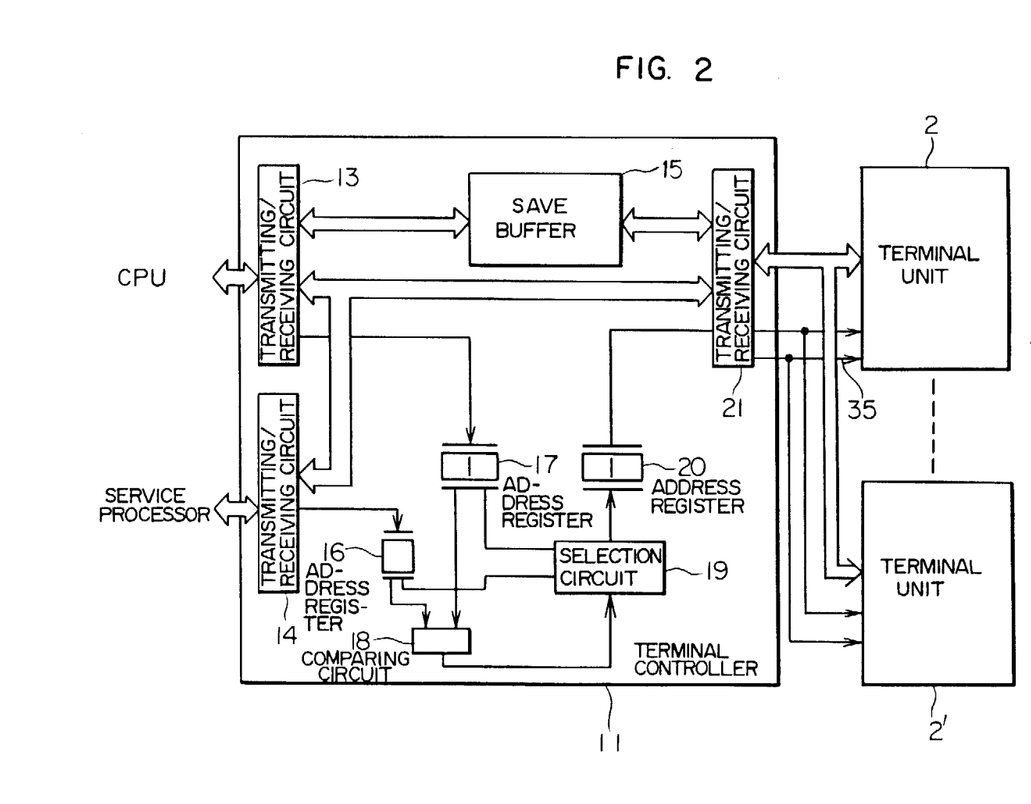
FIG. 2 is a scheme illustrating the construction of an embodiment of multi-window display control systems according to this invention.

The present invention solves the problems of the prior art techniques. FIG. 2 indicates the construction of an embodiment of the multi-window display control system according to this invention. In FIG. 2 a terminal controller 11 is connected through a transmitting/receiving circuit 21 with a plurality of terminals 2 and 2', each of which includes a multi-window display.

The terminal controller 11 is connected through transmitting/receiving circuits 13 and 14 with a CPU and a service processor respectively. The service processor has a priority higher than that of the CPU. A save buffer 15 is disposed in the terminal controller 11 for saving a business screen coming from the CPU. A console address register 16 holds the terminal address indicating which terminal is selected to display console messages. A business screen address register 17 holds the terminal address and the virtual screen buffer address indicating the business message. The addresses set in the registers 16 and 17 are held until the new following addresses are set. A comparing circuit 18 is a circuit which compares the terminal address in the business screen address register 17 with the terminal address in the console address register 16. A selection circuit 19 is a circuit which updates and stores the state of use of the virtual screen buffer when the addresses coincide as a result of the comparison in the comparing circuit 18, and for selecting one of the virtual screen buffers when the console message is received. A virtual screen buffer controlling signal 35 is a signal for controlling the order of priority for the display of the virtual screen buffers in the terminal 2.

When a business message from the CPU is received by the transmitting/receiving circuit 13, the address of the terminal for the display and the virtual screen buffer address, which are included in the message command are held in the business screen address register 17. The terminal address of this business screen address register 17 is compared with the terminal address of the console address register 16 in the comparing circuit 18. In the case where, as the result of the comparison, they are determined to be in accordance with each other, the virtual screen buffer address of the business screen register 17 is sent to a selection circuit 19, which updates the state of use of the virtual screen buffer address.

In the case where a console message is received from the service processor, one of the virtual screen buffer addresses is selected by the selection circuit 19, depending on the state of use of the virtual screen buffers. The business screen of the selected virtual screen buffer address is stored in the save buffer 15. A console message is sent to the virtual screen buffer address and a virtual screen buffer control signal 35 is sent to the terminal 2, which raises the priority of the display of the console message, depending on the signal, and displays the console message at the highest rank.

The termination of the display of the console message is effected by returning the business screen in the save buffer 15 to the virtual screen buffer, which displayed the console message.

Further, in the case where a command of reading-out or writing-in of a business message is received for the virtual screen buffer displaying a console message, the reading-out or the writing-in is effected to the save buffer 15.

Figure 3:
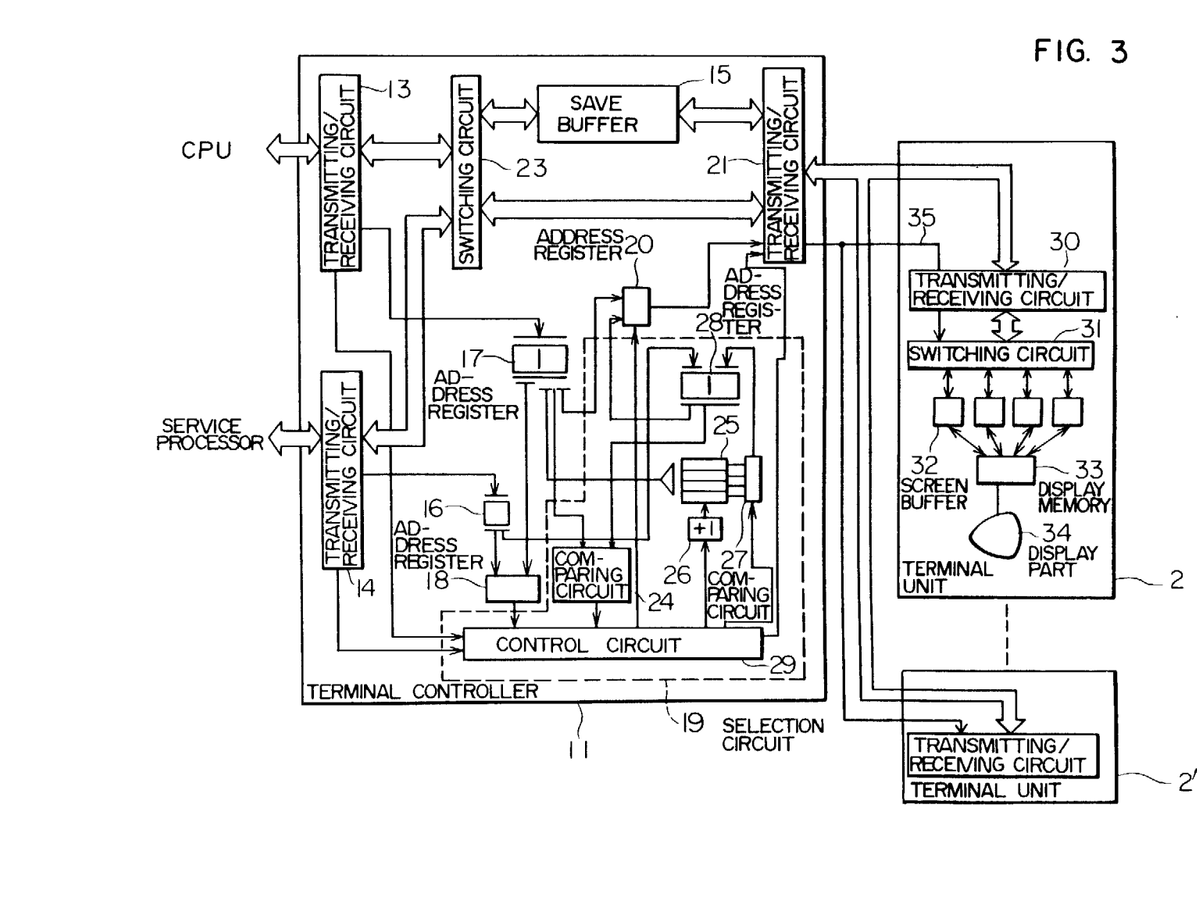
FIG. 3 is a more detailed scheme of the embodiment shown in FIG. 2.

FIG. 3 is a more detailed scheme of the device indicated in FIG. 2. Hereinbelow the embodiment will be explained, referring to FIG. 3.

The terminal 2 has 4 virtual screen buffers 32 and is so constructed that either the content of one of them is selected and displayed or the 4 contents of all of them are superposed as a multiwindow display and one of them is displayed at the highest rank. The terminal controller 11 is connected through the transmitting-/receiving circuits 21 and 30 with the terminal 2 having a multi-window display. The save buffer 15 in the terminal controller 11 is located between the transmitting-/receiving circuit 21 and a switching circuit 23 and the screen of one of the virtual screen buffers 22 is saved. The switching circuit 23 is connected with the transmitting/receiving circuit 13, which transmits or receives business messages, and the transmitting/receiving circuit 14, which transmits or receives console messages from the service processor, and switches the signal path to either one of the transmitting/receiving circuits 13 and 14 according to a command of the control circuit 29, which has received the message transmitting-/receiving signal of the transmitting/receiving circuit 13 or 14. The switching circuit 23 also switches the signal path to either the save buffer 15 or the transmitting/receiving circuit 21 according to a command of the control circuit 29.

The comparing circuit 18 compares the contents of the console address register 16 (which indicates the address of the terminal displaying console messages), with the terminal address in the business screen address register 17 (which indicates the address of the terminal displaying business messages, and the virtual screen buffer address) and reports the result of the comparison to the control circuit 29. The contents of the console address register 16 are previously set by the service processor through the transmitting/receiving circuit 14. That is, one of the terminals 2 is assigned as the common terminal. In this way it is possible to assign any terminal as the common terminal and to change this assignment.

The state of use of each of the four virtual screen buffers 32 in the terminal which the console address register 6 has specified as the common terminal displaying console messages, is stored in supervising tables 25. The supervising tables 25 are decoded by the virtual screen buffer address in the business screen address register 17 and one supervising table is selected. The content of the selected supervising table is counted up by a count-up circuit 26 according to a command from the control circuit 29. This is for the purpose of storing the frequency of use of each of the virtual screen buffers. The comparing circuit 27, started by the control circuit 29, compares the contents of the supervising tables 25 with each other, and outputs the virtual screen buffer address having the smallest value. In this way the virtual screen buffer whose frequency of use is the lowest is selected.

The console display address register 28 holds the contents of the console address register 16 and the selected virtual screen buffer address outputted by the comparing circuit 27 and is connected to the display address register 20. Furthermore, the contents of the console display address register 28 and the output of the business screen address register 17 are inputted to the comparing circuit 24, which reports the result of the comparison to the control circuit 29. The comparison is effected in order to determine whether the terminal 2 is displaying the console message by using the virtual screen buffer specified in the terminal 2 when it receives a business message writing-in or reading-out command.

The display address register 20 is connected with the business screen address register 17 and the console display address register 28, and holds either one of their values according to the command of the control circuit 29.

The terminal 2 is connected through the transmitting-/receiving circuit 21 and 30 with the terminal controller 11. The switching circuit 31 selects one of the four virtual screen buffers 32, depending on the content of the display address register 20 and effects the transmission/reception of the message. The switching circuit 31 is connected with the control circuit 29 in the terminal controller 11 by the virtual screen buffer controlling signal 35. It sets the message of the virtual screen buffer 32, which is the contents of the display address register 20, at the highest rank among the four virtual screen buffers 32. The message is synthesized in the display memory 33 and displayed in the display part 34.

First, the operation of the device indicated in FIG. 3 will be explained for the case where a business message is received.

When the transmitting/receiving circuit 13 receives a business message, it so informs the control circuit 29. The control circuit 29 issues a business message address transmission request to the transmitting/receiving circuit 13 and sets a business message display address in the business screen address register 17.

Then, the control circuit 29 starts the comparing circuit 18. The comparing circuit 18 compares the terminal address in the business screen address register 17 with the content of the console address register 16 set previously through the transmitting/receiving circuit 14 by the service processor. In the case where, as the result of the comparison, they are not in accordance, i.e., the case where a business message is outputted through a terminal which is not specified as the console terminal, the control circuit 29 sends forward the contents of the business screen address register 17 to the display address register 20 and sends the terminal address and the virtual screen buffer address through the transmitting/receiving circuit 21 to the terminal 2. Next the control circuit 29 connects the transmitting/receiving circuit 21 by means of the switching circuit 23 and sends the business message to a specified terminal, such as the terminal 2'.

In the case where they are in accordance, i.e., the case where a business message is outputted through a terminal which is specified as the console terminal, the control circuit 29 sends forward the content of the business screen address register 17 to the display address register 20. The control circuit 29 also selects a supervising table corresponding to the virtual screen buffer address in the business screen address register 17 from the virtual screen buffer supervising table 25. At the same time, the control circuit 29 starts the count-up circuit 26 and increases the content of the selected table by 1. Furthermore, the control circuit 29 connects the transmitting/receiving circuit 13 with the transmitting/receiving circuit 21 by means of the switching circuit 23 and sends the business message to the terminal 2.

Next, the operation of the device indicated in FIG. 3 will be explained for the case where a console message is received.

When the transmitting/receiving circuit 14 receives the console message, it informs the control circuit 29. The control circuit 29 sends the terminal address indicated by the console address register 16 to the console display address register 28. At the same time, it starts the comparing circuit 27 and sends forward to the console address display register 28, the virtual screen buffer address holding the smallest value among the virtual screen buffer supervising tables 25 (as determined by the output of the comparing circuit 27). Then the control circuit 29 sends forward the content of the console display address register 28 to the display address register 20 and stores the virtual screen buffer 32 indicated by the display address register 20 through the transmitting/receiving circuit 21 in the save buffer 15. Next, the control circuit 29 connects the transmitting/receiving circuit 14 with the transmitting/receiving circuit 21 by means of the switching circuit 23 and sends the console message to the terminal 2. In addition, the control circuit 29 sends a screen control signal 35 to the switching circuit 31 in the terminal 2.

For the restoration (re-display) of the saved screen, the console display address register 28 is reset after having written the content of the save buffer 15 to the virtual screen buffer 32 indicated by the display address register 20.

Now, the case where a business message is received during the display of a console message will be explained.

The fact that an address is set in the console display address register 28 indicates that a console message is being displayed. The control circuit 29 starts the comparing circuit 24, which compares the business screen address register 17 with the console display address register 28. In the case where the comparison indicates they are in accordance, the control circuit 29 connects the transmitting/receiving circuit 13 with the save buffer 15 by means of the switching circuit 23 and writes the received business message in the save buffer 15. In the case where the comparison indicates they are not in accordance, the work is identical to that for the reception of the business message described previously.

Next, the operation of sending out a business message will be explained.

The operation of sending out a business message is identical to the operation in the case where the business message is received, apart from the difference in the direction of the transmission of the business message. Further, the operation of sending out a business message, when a console message is being displayed, is also identical thereto apart from the fact that the reading-out is effected from the save buffer 15.

Next, the operation of sending out a console message will be explained below.

The operation of sending out a console message is identical to the operation of sending out a business message apart from sending forward the content of the console display address register 28 to the address register 20 and connecting the transmitting/receiving circuit 14 with the transmitting/receiving circuit 21.

The operation of the terminal 2 indicated in FIG. 3 will now be explained below.

The terminal 2 takes in the contents of the display address register 20 in the terminal controller 11 through the transmitting/receiving circuits 21 and 30. In the case where the one terminal address is in accordance with the terminal address of the display address register 20, the switching circuit 31 selects one of the virtual screen buffers 32 according to the virtual screen buffer address of the display address register 20 and effects transmission/reception of the business message or the console message. Further, when the switching circuit 31 receives a virtual screen buffer control signal 35 from the control circuit 29 in the terminal controller 11, it synthesizes the virtual screen buffer indicated by the display address register 20 at the highest rack in the display memory 33 and displays it in the display part 34.

It is possible for an operator to arbitrarily exchange which terminal displays the console message by setting the contents of the console address register 16 from the terminal 2. It is also possible to select and output the output of the comparing circuit 17 by the least recently used (LRU) rule or the first in first out (FIFO) method. That is, in the above embodiment the number of times of use of each of the virtual screen buffers is recorded in the supervising tables 25 and the buffer whose number of times of use is the smallest is the object of the saving. According to the LRU method, the order of use of the different buffers is recorded and the buffer which has been used earliest is the object of the saving. Furthermore, according to the FIFO method the buffers are the object of the saving in the order in which they have been used.

Figure 4:
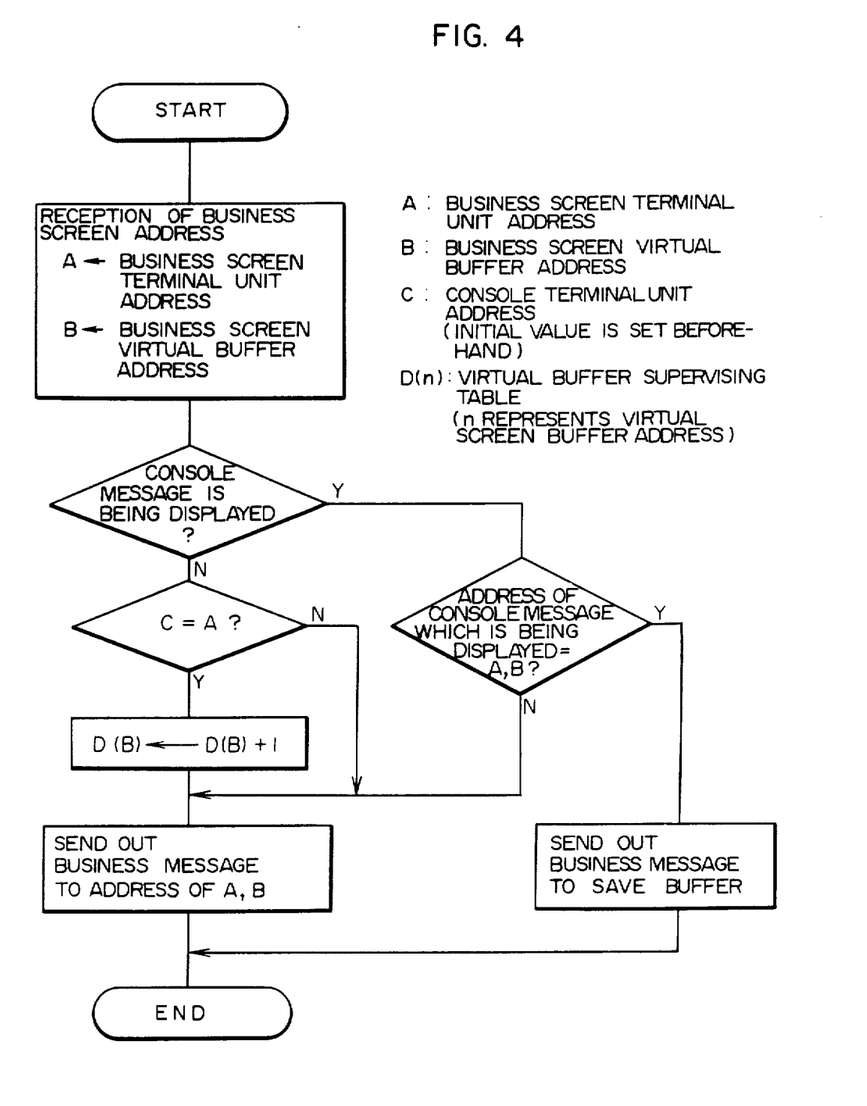
FIG. 4 is a flow chart of a program in the case where a message for business is received.
Figure 5:
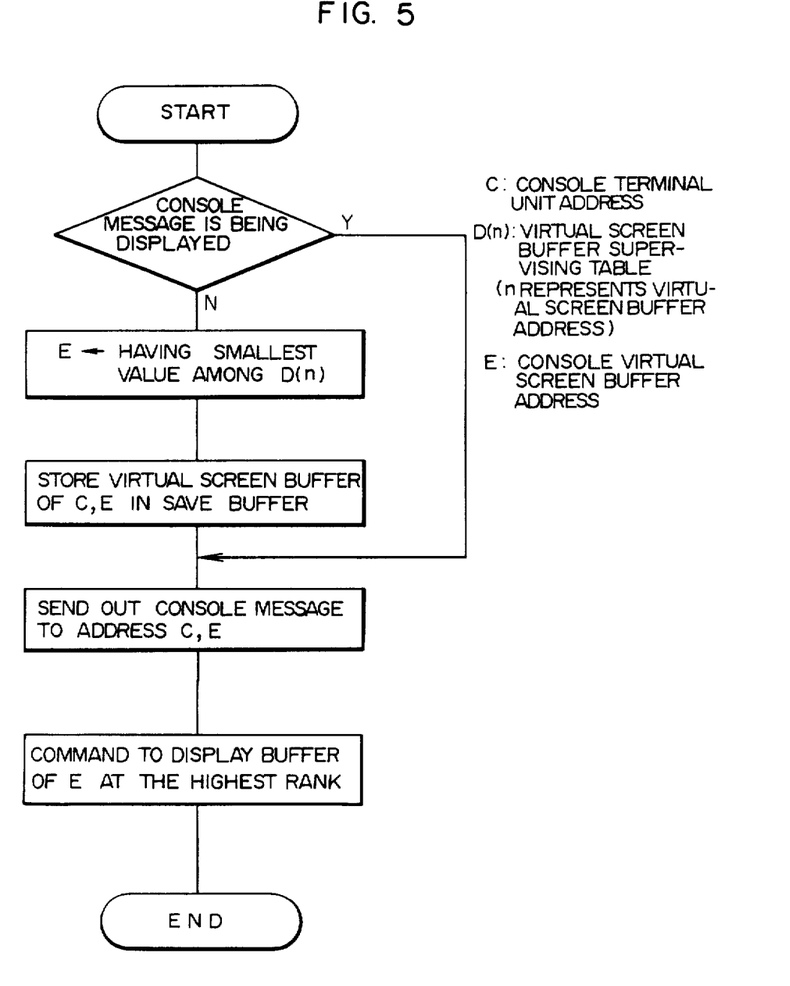
FIG. 5 is a flow chart of a program in the case where a console message is received.
Figure 6:
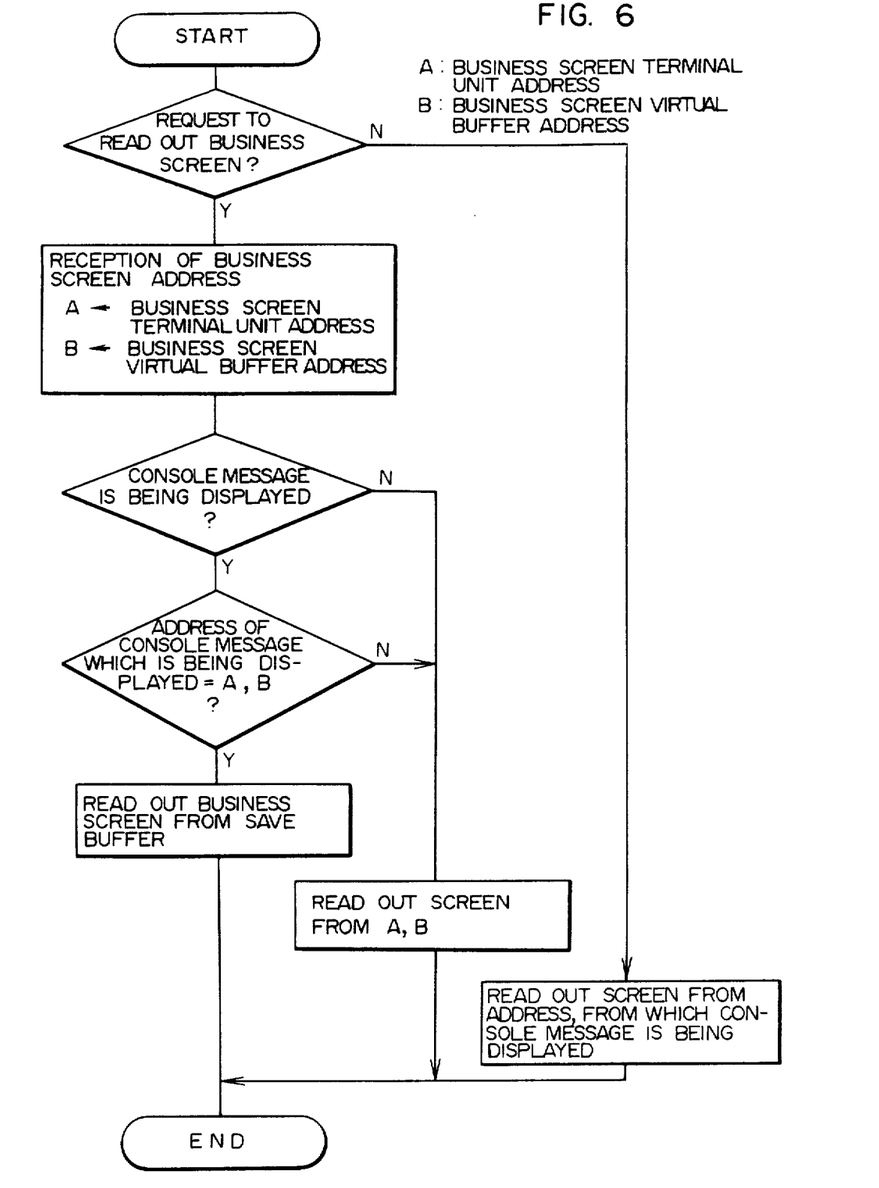
FIG. 6 is a flow chart, in the case where a transmission operation of a screen for business or a console screen is effected.

The functions of the console address register 16, the business screen address register 17, the comparing circuits 18, 24, 27, the control circuit 29, the virtual screen buffer supervising tables 25, the count-up circuit 26, the console display address register 28 and the display address register 20 (See FIG. 3) can all be realized in software by so constructing the terminal controller 11, e.g., by utilizing microprocessor architecture. Flow charts of the program of the terminal controller 11 in this embodiment are indicated in FIGS. 4, 5 and 6. FIG. 4 is a flow chart of the program in the case where a business message is received. FIG. 5 is a flow chart in the case where a console message is received. FIG. 6 is a flow chart of the program in the case where an operation to send out a business screen or a console screen is effected.

In addition, in the situation where messages having high priorities, such as stock price information, inquiring information, etc., are displayed in a terminal connected to a sub-processor from the host processor it is possible to realize the functions of the service processor described above by replacing it with a host processor.

Although, according to the embodiments described above, the contents of a virtual screen buffer in which a message is outputted from the service processor having a priority higher than that of the CPU are displayed automatically at the highest rank, it is also possible to display them at the highest rank through keyboard operations performed by the operator. In this embodiment the fact that a message has arrived from the service processor having a high priority is brought to the operator's attention by means of a lamp or a part of the screen.

While particular embodiments of the invention have been shown and described, it will be obvious to those skilled in the art that various changes and modifications may be made without departing from the present invention in its broader aspects.

We claim:

1. In a multi-window control system, which is provided with at least one terminal having a multi-window display, said at least one terminal being connected, through a terminal controller, to a plurality of processors including a first processor and a second processor having a priority higher than that of said first processor, wherein messages coming from said first processor and messages coming from said second processor are displayed under control of said terminal controller, the improvement, wherein said terminal controller comprises:

control means for controlling internal operation of the terminal controller;

first holding means for holding a first terminal address of a first terminal, which is to display a first message coming from the first processor, and a first virtual screen buffer address of a virtual screen buffer in said first terminal;

second holding means for holding a second terminal address of a predetermined terminal which is to display a second message coming from the second processor;

first comparing means, coupled to said first and second holding means and said control means, for comparing said first terminal address with said second terminal address when a message coming in from said processor is received by said memory means for storing indicators for state of use a plurality of virtual screen buffers in said predetermined terminal;

selection means, coupled to said memory means, for selecting one of said plurality of virtual screen buffers in response to said state of use indicators;

save buffer means, coupled to said plurality of virtual screen buffers, for saving a content of said one of said plurality of virtual screen buffers selected by said selection means;

update means, coupled to said memory means, for updating said state of use indicators; and switching means, coupled to said plurality of virtual screen buffers, said first processor and said save buffer means, for switching said first message between said first processor, and a selected one of said save buffer means and said plurality of virtual screen buffers, wherein said switching means, said update means, and said selection means are responsive to said control means.

2. A multi-window control system according to claim 1, wherein said terminal controller further includes;

third holding means, coupled to said second holding means and said selection means, for holding said second terminal address and a second virtual screen buffer address of said one of said plurality of virtual screen buffers selected by said selection means; and second comparing means coupled to said control means, said first holding means and said third holding means, for comparing said first terminal address and said first virtual buffer address with said second terminal address and said second virtual buffer address, wherein said control means operates said switching means responsive to said second comparison means.

3. A multi-window control system according to claim 1, wherein said terminal controller further comprises, means for informing said predetermined terminal of reception of said second message coming from the second processor and said predetermined terminal unit further comprises means for informing an operator of reception of said second message.

4. A multi-window control system according to claim 1, wherein said update means includes means for counting a number of times of use of each of said plurality of virtual screen buffers said state of use indicators being updated responsive to said counting, and wherein said selection means is operable to select said one of said plurality of virtual screen buffers responsive to said number.

5. A multi-window control system according to claim 1, wherein said selection means is operable to select said one of said plurality of virtual screen buffers responsive to order of use of said plurality of virtual screen buffers.

6. A multi-window control system according to claim 1, further comprising address changing means, coupled to said second holding means, for changing said second terminal address.

* * * * *